US006991289B2

(12) United States Patent
House

(10) Patent No.: US 6,991,289 B2
(45) Date of Patent: Jan. 31, 2006

(54) SEATBACK AUDIO SYSTEM

(75) Inventor: William Neal House, Greenwood, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 0 days.

(21) Appl. No.: 10/631,184

(22) Filed: Jul. 31, 2003

(65) Prior Publication Data

US 2004/0021350 A1  Feb. 5, 2004

Related U.S. Application Data

(60) Provisional application No. 60/400,369, filed on Jul. 31, 2002.

(51) Int. Cl.
A47C 7/62 (2006.01)
A47C 31/00 (2006.01)

(52) U.S. Cl. ............... 297/217.4; 181/141; 181/148
(58) Field of Classification Search .......... 297/217.4, 297/217.5; 181/141, 146
See application file for complete search history.

(56) References Cited

U.S. PATENT DOCUMENTS

| | | |
|---|---|---|
| 2,452,103 A | 10/1948 | Conradt et al. |
| 2,501,993 A | 3/1950 | Conradt |
| 2,527,656 A | 10/1950 | Reinsdorf |
| 2,710,662 A | 6/1955 | Camras |
| 2,802,906 A | 8/1957 | Goldenberg et al. |
| 2,908,766 A | 10/1959 | Taylor |
| 3,156,500 A | 11/1964 | Kerr |
| 3,385,393 A | 5/1968 | Gold |
| 3,512,605 A * | 5/1970 | McCorkle ............... 181/141 X |
| 3,556,088 A | 1/1971 | Leonardini |
| 3,880,152 A | 4/1975 | Nohmura |
| 3,918,551 A | 11/1975 | Rizo-Patron |
| 3,944,020 A | 3/1976 | Brown |
| 3,976,162 A | 8/1976 | Cummings |
| 4,020,284 A | 4/1977 | Phillips |
| 4,023,566 A | 5/1977 | Martinmaas |
| 4,025,724 A | 5/1977 | Davidson, Jr. et al. |
| 4,027,112 A | 5/1977 | Heppner et al. |
| 4,038,499 A | 7/1977 | Yeaple |
| 4,042,791 A | 8/1977 | Wiseman |
| 4,055,170 A | 10/1977 | Nohmura |
| 4,061,877 A | 12/1977 | Phillips |

(Continued)

FOREIGN PATENT DOCUMENTS

DE   198 40 444 A1   5/1999

(Continued)

*Primary Examiner*—Anthony D. Barfield
(74) *Attorney, Agent, or Firm*—Brinks Hofer Gilson & Lione

(57) ABSTRACT

A seatback audio system having one or more speakers mounted in a surface of a seatback or a headrest. The speakers may be separated by a sound barrier to reduce cross-talk between the speakers. The surface may have a concave area where the speakers and the sound barrier are mounted. Alternatively, the surface may have two concave areas, and one speaker may be mounted in each concave area. The system may include a manual or an automated positioning system for one or both of the speakers. The system may also include a soft-cell waveguide having a plurality of tubes to direct the sound from one or both of the speakers. The seatback may include a backrest and a removable headrest, each including an electrical connector, where the one or more speakers are mounted to the headrest and the electrical connectors form a circuit when the headrest is mounted to the backrest.

52 Claims, 13 Drawing Sheets

U.S. PATENT DOCUMENTS

| | | |
|---|---|---|
| 4,064,376 A | 12/1977 | Yamada |
| 4,075,438 A | 2/1978 | Kappel |
| 4,124,249 A | 11/1978 | Abbeloos |
| 4,156,177 A | 5/1979 | Coates |
| 4,210,784 A | 7/1980 | Phillips |
| 4,254,067 A | 3/1981 | Elliott |
| 4,289,936 A | 9/1981 | Civitello |
| 4,310,307 A | 1/1982 | Bellisario |
| 4,440,443 A | 4/1984 | Nordskog |
| 4,490,842 A | 12/1984 | Watanabe |
| D277,630 S | 2/1985 | Olsen et al. |
| 4,565,405 A | 1/1986 | Mayer |
| 4,638,884 A | 1/1987 | Lee |
| 4,641,345 A | 2/1987 | Takahashi |
| 4,696,370 A | 9/1987 | Tokumo et al. ............. 181/141 |
| 4,758,047 A | 7/1988 | Hennington |
| 4,778,027 A | 10/1988 | Taylor |
| 4,797,934 A | 1/1989 | Hufnagel |
| 4,866,888 A | 9/1989 | Murai et al. |
| 4,877,105 A | 10/1989 | Mugikura |
| 4,979,777 A | 12/1990 | Takada |
| 4,991,222 A | 2/1991 | Nixdorf |
| 5,101,810 A | 4/1992 | Skille et al. |
| 5,113,852 A | 5/1992 | Murtonen |
| 5,143,055 A | 9/1992 | Eakin |
| 5,147,109 A | 9/1992 | Jolly |
| 5,191,177 A | 3/1993 | Chi |
| 5,193,118 A | 3/1993 | Latham-Brown et al. |
| 5,199,075 A | 3/1993 | Fosgate |
| 5,301,237 A | 4/1994 | Fosgate |
| 5,314,403 A | 5/1994 | Shaw |
| 5,318,340 A | 6/1994 | Henry ........................ 297/232 |
| 5,387,026 A | 2/1995 | Matsuhashi et al. |
| 5,398,992 A | 3/1995 | Daniels |
| D361,674 S | 8/1995 | Carter, Sr. |
| 5,482,352 A | 1/1996 | Leal et al. |
| 5,608,806 A | 3/1997 | Hinojosa |
| 5,687,246 A | 11/1997 | Lancon |

FOREIGN PATENT DOCUMENTS

| | | |
|---|---|---|
| EP | 0 993 230 A2 | 4/2000 |
| JP | 1995264689 A | 10/1995 |

\* cited by examiner

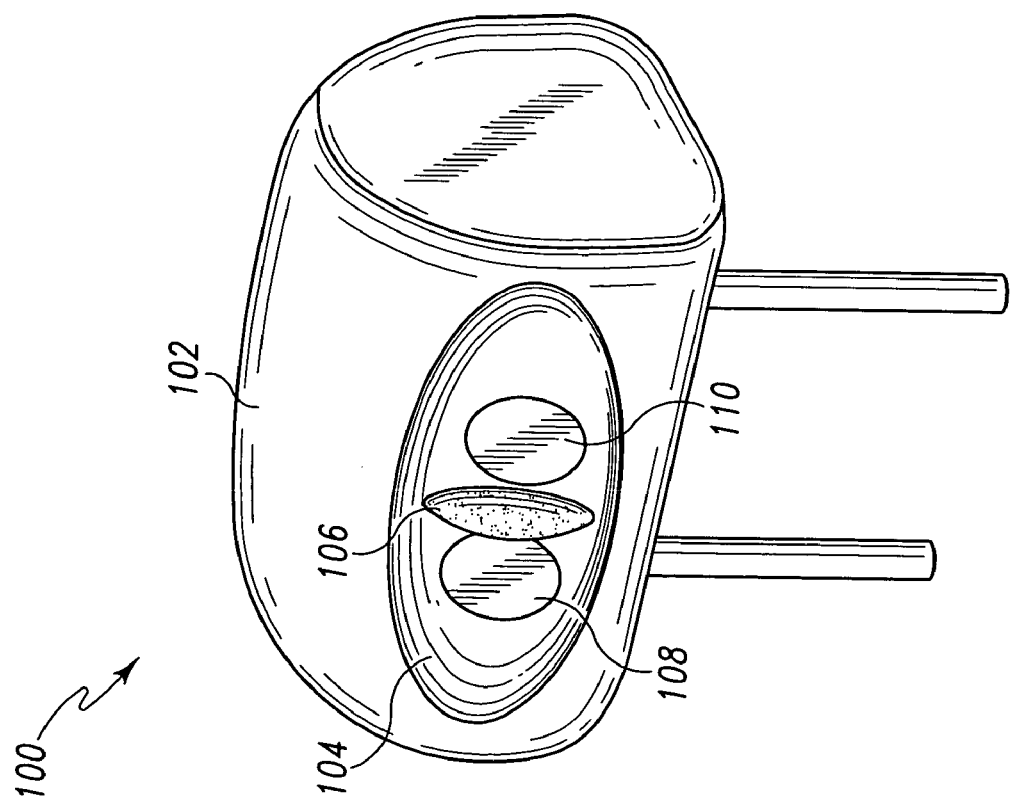
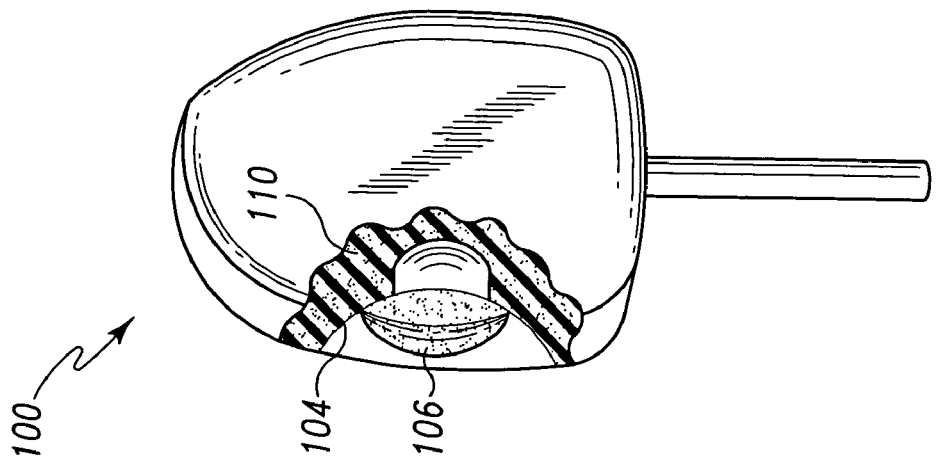
Fig. 1
Fig. 2

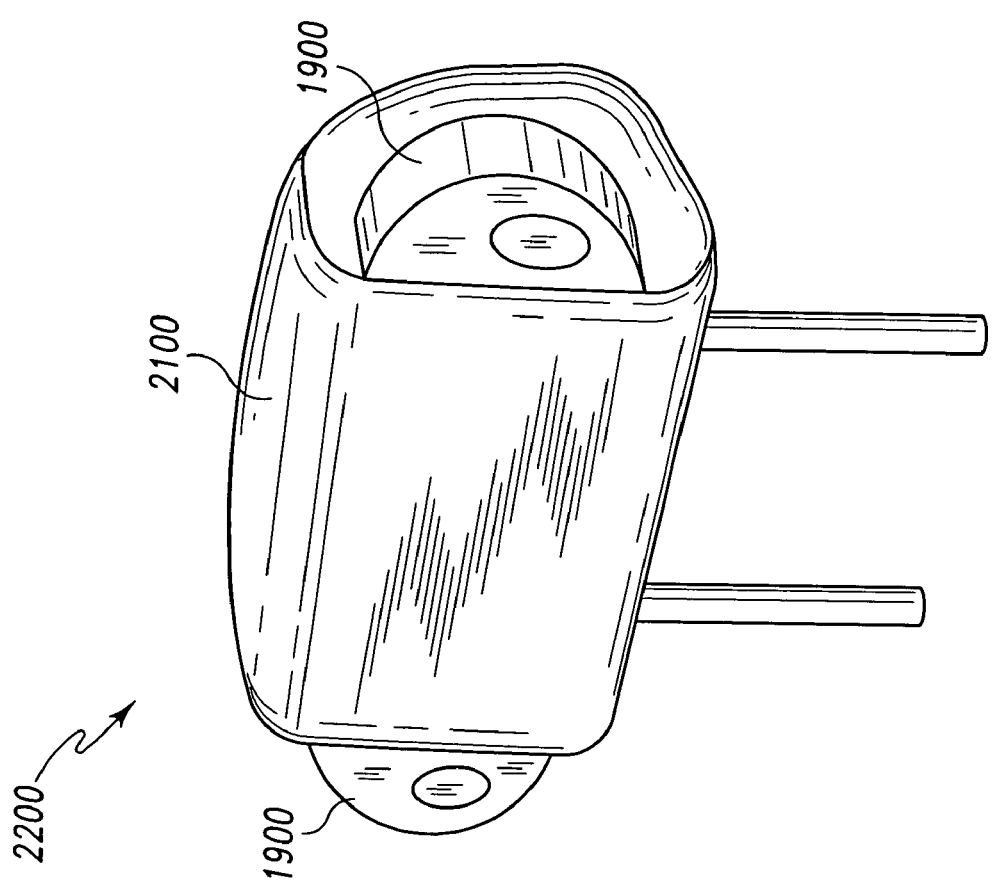

SEATBACK AUDIO SYSTEM

This application claims the benefit of U.S. Provisional Application No. 60/400,369 filed Jul. 31, 2002. The disclosure of the above application is incorporated herein by reference.

BACKGROUND OF THE INVENTION

1. Technical Field

This invention relates to an audio system, and more particularly, to an audio system that may be used in a seatback.

2. Related Art

Loudspeakers or speakers may be mounted in a seatback for a variety of applications. For example, it may be desirable to mount stereo speakers in the seatbacks of a home theatre, an amusement park ride, a theater, an automobile, an aircraft, a train, or the like. Seat-mounted speakers may provide entertainment audio, such as music or a movie soundtrack, and/or informative audio (telematics), such as instructions from a pilot, or directions from a speech-enabled vehicle navigation system.

Speakers mounted in a vehicle seatback convert electrical signals into sound. The sound may provide entertainment through music or provide information through instructions or directions. In some speaker systems, it may be desirable to receive sound through a direct path to the front of a listener. The sound may use two or more separate channels, such as stereo, that give the sound a more natural distribution.

A seat positioned in front of a speaker may offer listeners a distorted version of a sound as obstructions or absorbent materials may change a sound's characteristics. When speakers are mounted in a seatback in close proximity to one another, there may be an increased possibility of cross-talk, in which undesired signals or sounds are heard through the coupling of channels. Therefore, there is a need for a seatback audio system that maintains channel separation and generates sound that is perceived to have traveled directly to the front of the listener.

It also may be desirable to provide a seat configured to receive one or more sets of seatback speakers. For example, an automobile manufacturer may provide an automobile seat having a receptacle configured to receive a headrest having an integrated speaker. A need exists for a semi-automated or automated electrical connection between a seat and a portion of a seatback having an integrated speaker.

SUMMARY

The seatback audio system has one or more speakers mounted in a surface of a seatback. The speakers may be separated by a sound barrier to reduce cross-talk between the speakers. The sound barrier may be an acoustically absorbent material, or it may be an acoustically reflective material.

The front surface of the seatback may have a concave area where the speakers and the sound barrier are mounted. Alternatively, the front surface of the seatback may have two concave areas, and one speaker may be mounted in each concave area. The sound barrier may be mounted to the "flat" portion of the front surface, between the two concave areas.

The system may also include a manual, semi-automated, or an automated positioning system for one or both of the speakers. The system may additionally include a soft-cell waveguide having a plurality of tubes to direct the sound from one or both of the speakers. Each tube of the soft-cell waveguide may act as a horn, directing sound from the respective speaker to an intended location such as the listener's ear.

The seatback may include a backrest and a removable headrest, where the one or more speakers are mounted to the headrest. The backrest the headrest may each include an electrical connector. The electrical connectors may form a circuit when the headrest is mounted to the backrest, thus enabling operation of the one or more speakers.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a perspective view of a first example of a seatback audio system having a dipole speaker arrangement.

FIG. 2 is a cutaway side view of the first example seatback audio system of FIG. 1.

FIG. 22 is a perspective view of the example headrest of FIG. 21 assembled with the example seatback audio system of FIG. 19.

DETAILED DESCRIPTION OF THE PREFERRED EMBODIMENTS

Figure 4:
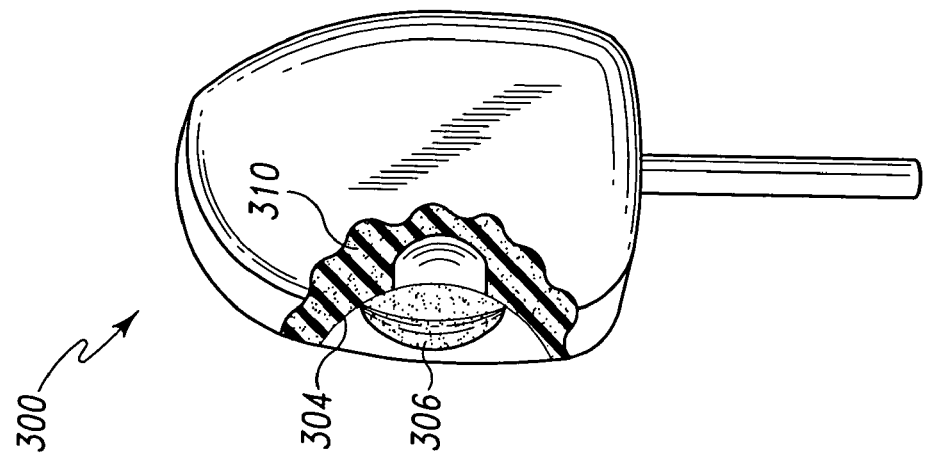
FIG. 4 is a cutaway side view of the second seatback audio system of FIG. 3.

An audio seatback system is disclosed that produces an audio sound field utilizing a seatback. The seatback may be a backrest, a headrest, an integrated backrest/headrest combination, or a headrest coupled to a backrest. Speakers may be included with the backrest, the headrest, or an integrated combination thereof. The seatback audio system may take several forms and may be used as the primary speakers for a sound system, in conjunction with low frequency speakers, or may be added to a conventional audio system to improve the spatial characteristics of stereo or surround sound systems. The speakers of the seatback audio system may be utilized for any channel within any system, such as the left/right, side/rear reproduction channels of a surround sound system.

The speakers may function to convey telematics, warning or entertainment signals (music or dialog). The audio seatback system may incorporate several techniques or combinations thereof to accomplish specific audio requirements. These include: backrest and headrest geometry, number of speakers used, speaker locations on the headrest and/or backrest, and relative positioning of the speakers on the headrest and/or backrest.

Several illustrative audio seatback system configurations are described below. Many more configurations and implementations are possible within the scope of the invention. The configurations described below are for illustration only. Accordingly, the invention is not to be restricted except in light of the attached claims and their equivalents.

First Seatback Audio System

A first example seatback audio system 100 for providing audio to a seat occupant is shown in FIGS. 1 and 2. The seatback audio system 100 may have a stereo dipole speaker arrangement, which includes speakers 108 and 110. The speakers 108 and 110 may be mounted in a concave area 104 of a front surface of a headrest 102. As used herein, the term "front surface" refers to a surface of a seatback that faces the seat occupant. While the examples refer to front surface mounted speakers, speakers may be mounted in any surface of the headrest, including the rear surface, such as in conjunction with passenger entertainment systems and the like.

The seatback audio system 100 may also include a sound barrier 106. The sound barrier 106 is located between the speakers 108 and 110. The speakers 108 and 110 may each be, for example, a miniature high-fidelity transducer, such as a 12 to 50 mm driver of the type found in laptop computers, a planer ("flat") transducer, or some other type of transducer suited for mounting in seatback.

As shown in FIG. 2, the speakers 108 and 110 may be mounted so that their faces lie flush with the surface of the concave area 104. In vehicles, the placement of the speakers 108 and 110 may be made such that specific impact safety requirements are met. This may be accomplished by, for example, recessing the speakers 108 and 110 into the headrest 102 in a foam housing to minimize impact with any portion of the occupant's body. The diameters speakers 108 and 110 may be suitably small and recessed into the surrounding foam housing to minimize impact by a portion of the human body during an impact condition.

In stereo audio systems, it is desirable to maintain stereo separation (reduce "cross-talk") between the left and the right channels, so that sound from the right channel speaker does not reach the left ear of a listener, and vice versa. Cross-talk may be reduced by guiding sound waves, that is, by either reflecting or absorbing sound waves. Sound barrier 106 reduces cross-talk by guiding the sound waves emanating from the speakers 108 and 110 in a direction outwardly from the center or away from the opposite ear of the listener.

The sound barrier 106 may be mounted to conform to the surface of the concave area 104, and to protrude outwardly therefrom at least one-eighth of the lateral dimension of one of the speakers 108 and 110. The sound barrier 106 may be formed from an acoustically reflective or an acoustically absorbent material. For example, the sound barrier 106 may be formed from foam, plastic, wood, or the like. Additionally, the sound barrier 106 may be formed of some other rigid or flexible material, and covered with upholstery, such cloth, vinyl, or leather. In order to accommodate safety concerns, the sound barrier 106 may be formed from a soft, resilient material, such as foam.

Where the sound barrier 106 is formed from an acoustically reflective material, it may reduce cross-talk by reflecting sound waves emanating from speakers 108 and 110 outwardly from the center of the headrest 102. Where the sound barrier 106 is formed from an acoustically absorbent material, it may reduce cross-talk by absorbing sound waves traveling from speakers 108 and 110 towards the center of the headrest 102.

The sound waves emanating from speakers 108 and 110 may be further reflected outward by the occupant's head and neck, which may also act as a sound barrier between the speakers 108 and 110. By positioning the headrest 102 so that the speakers 108 and 110 are in the region between the occupant's ears and shoulders, a portion of the sound waves generated by the speakers 108 and 110 may be reflected up off the occupant's shoulders. A manual, semi-automatic, or automatic positioning system, as discussed with respect to FIGS. 16, 17, 18, 19, 20, 21, and 22 may be used to optimize the location of the speakers 108 and 110 relative to the occupant's ears.

The geometry of the headrest 102 also may serve as a wave guide to control the directivity of the sound field generated by speakers 108 and 110. For example, the concave area 104 may be deepened and narrowed to improve isolation of the occupant's sound field from others. Additionally, the geometry of the headrest 102 may also enable it to act as a physical barrier between the left and right speakers 108 and 110.

Second Seatback Audio System

Figure 3:
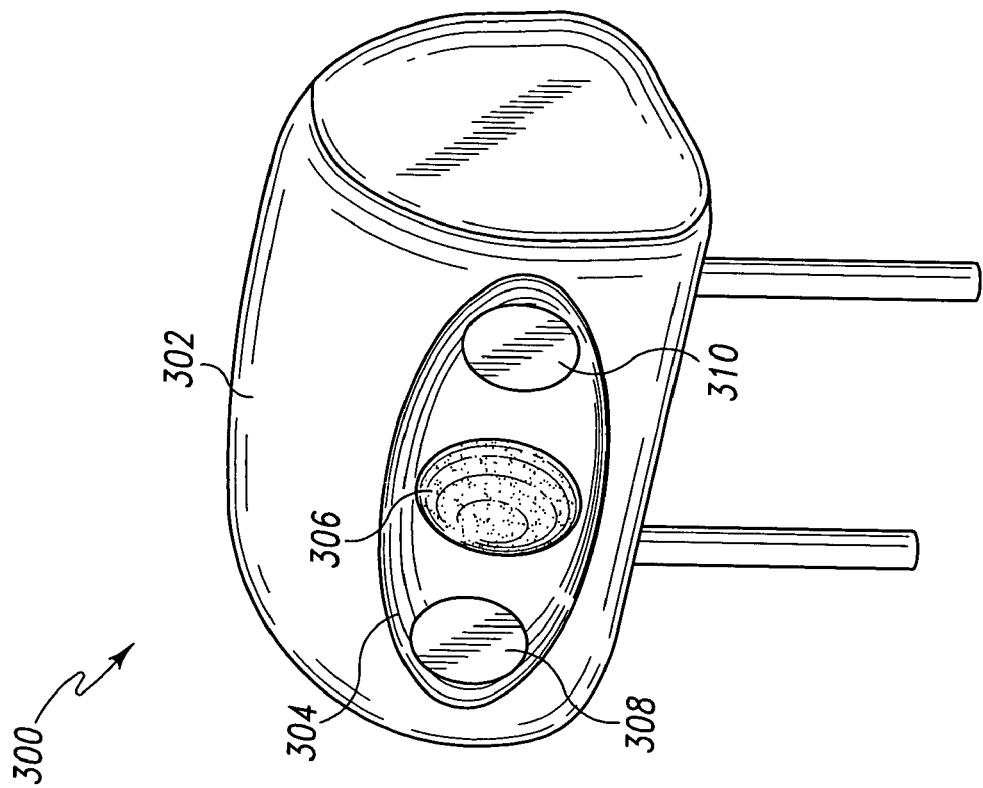
FIG. 3 is a perspective view of a second example of a seatback audio system having speakers mounted in a concave area of a headrest.

A second illustrative seatback audio system 300 is shown in FIGS. 3 and 4. The seatback audio system 300 may include speakers 308 and 310 mounted in a concave area 304 of a headrest 302. The seatback audio system 300 may also include a sound barrier 306. The speakers 308 and 310 and the sound barrier 306 may be similar to the speakers 108 and 110 and the sound barrier 106 of the seatback audio system 100.

As shown in FIG. 4, the speakers 308 and 310 and the sound barrier 306 are mounted to the headrest 102 in a similar manner to the analogous items in the seatback audio system 100. In the seatback audio system 300, however, the speakers 308 and 310 are mounted horizontally farther from the center of the headrest 302. By increasing the separation of the speakers 308 and 310 in this manner, cross-talk may be reduced, thereby improving left/right signal separation.

Like the sound barrier 106, the sound barrier 306 may reduce "cross-talk" by reflecting or absorbing sound waves emanating from speakers 308 and 310. The sound waves may also be reflected outward by the occupant's head and neck, and up from off of the occupant's shoulders. A manual, semi-automatic, or automatic positioning system may be used to optimize the location of the speakers 308 and 310 relative to the occupant's ears.

Third Seatback Audio System

Figure 6:
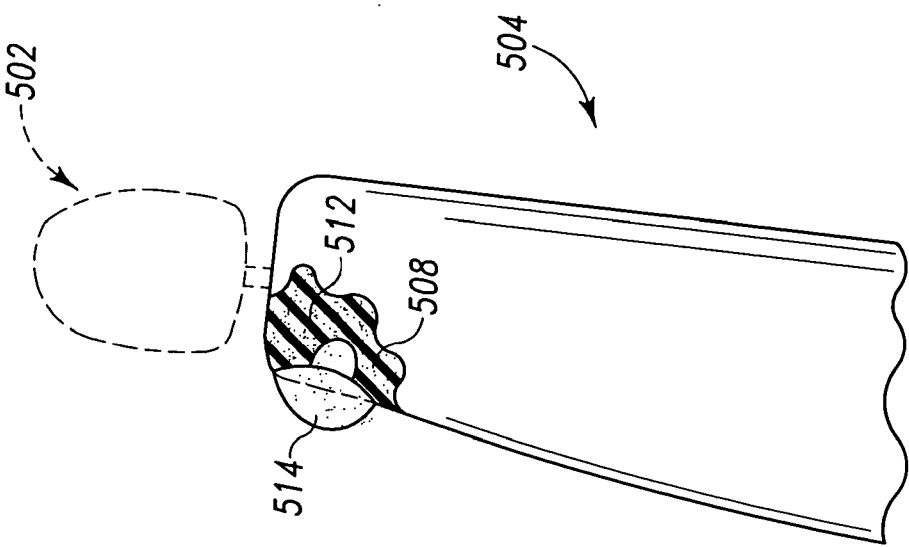
FIG. 6 is a cutaway side view of the third example seatback audio system of FIG. 5.
Figure 5:
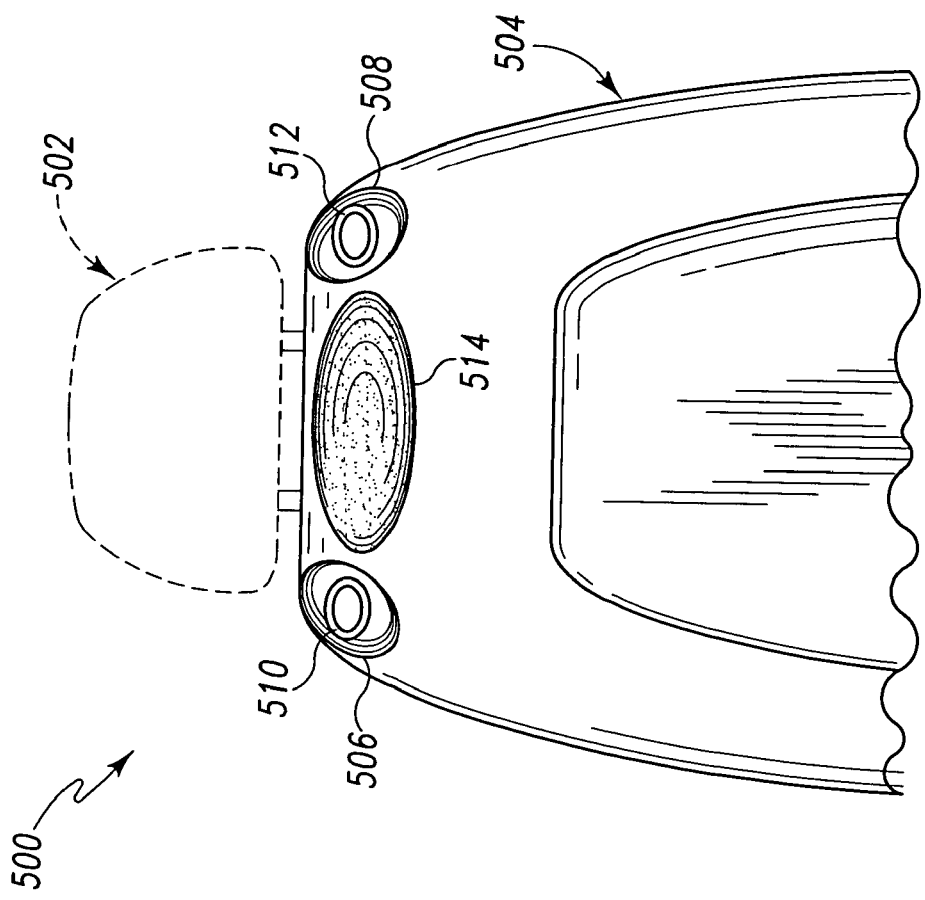
FIG. 5 is a perspective view of a third example of a seatback audio system having speakers mounted in a concave area of a backrest.

A third illustrative seatback audio system 500 is shown in FIGS. 5 and 6. The seatback audio system 500 may include a speaker 510 mounted in a concave area 506 of a backrest 504. A second speaker 512 may be mounted in a second concave area 506 of the backrest 504. The seatback audio system 500 may also include a sound barrier 514. A headrest 502 is shown for illustration. The geometry of the backrest 504 may be chosen to provide sound isolation to others by using a portion of the backrest 504 as a physical barrier to reduce and or control the dispersion pattern of the speakers 510 and 512. For example, the concave areas 506 and 508 may be deepened and narrowed to improve isolation of the occupant's sound field from others. Additionally, the lateral contour of the backrest 504 may also enable it to act as a physical barrier between the speakers 510 and 512.

As shown in FIG. 6, the speakers 510 and 512 may be mounted so that their faces lie flush with the surface of the concave areas 510 and 512. The sound barrier 514 may be mounted to conform to the surface of the backrest 504, and to protrude outwardly therefrom at least one-eighth of the lateral dimension of one of the speakers 510 and 512. The speakers 510 and 512 may be similar to the speakers 108 and 110.

The sound barrier 514 may be formed from a resilient acoustically reflective or an acoustically absorbent material. For example, the sound barrier 514 may be formed from some type of foam. Other materials, such as those described previously, also may be used. The sound barrier 514 may reduce "cross-talk" by reflecting or absorbing sound waves emanating from speakers 510 and 512. The sound barrier 514 may be positioned such that it is in contact with the occupant's back or shoulders. Thus, the concave areas 506 and 508, the sound barrier 514, and the occupant's back may direct sound from the speakers 510 and 512 to the occupant's respective ears. The sound waves also may be reflected outward by the occupant's neck, further increasing right/left separation. A manual, semi-automatic, or automatic positioning system may be used to optimize the location of the speakers 508 and 510 relative to the occupant's ears.

Fourth Seatback Audio System

Figure 8:
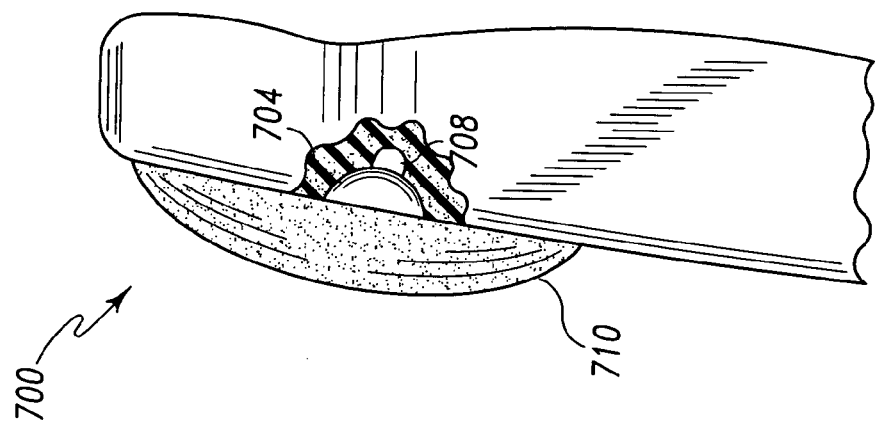
FIG. 8 is a cutaway side view of the fourth example seatback audio system of FIG. 7.
Figure 7:
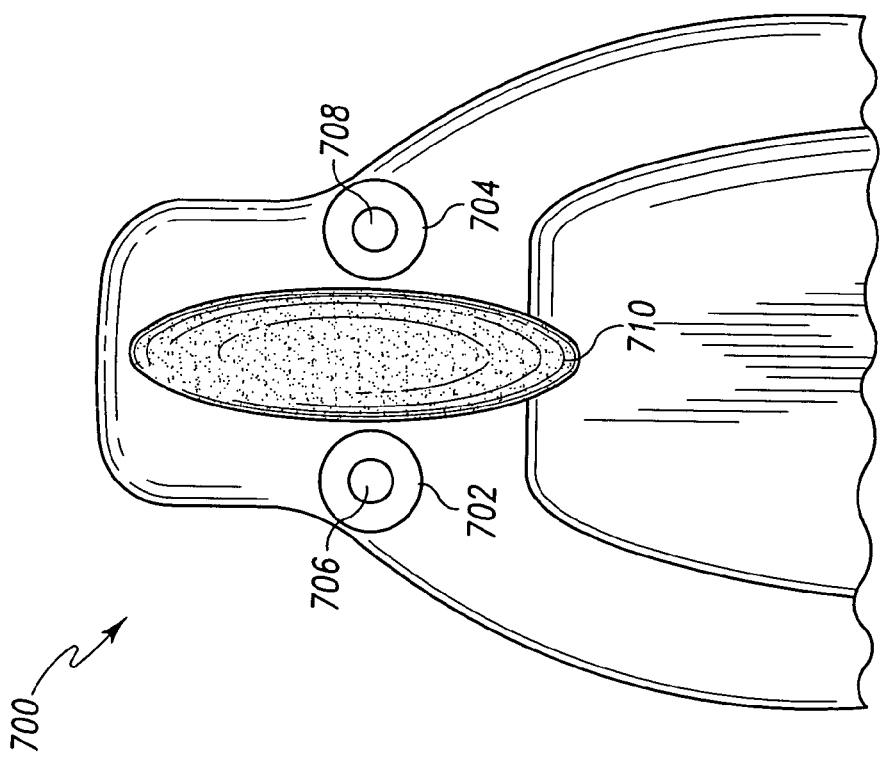
FIG. 7 is a perspective view of a fourth example of a seatback audio system having speakers mounted in a concave area of a seatback.
Figure 9:
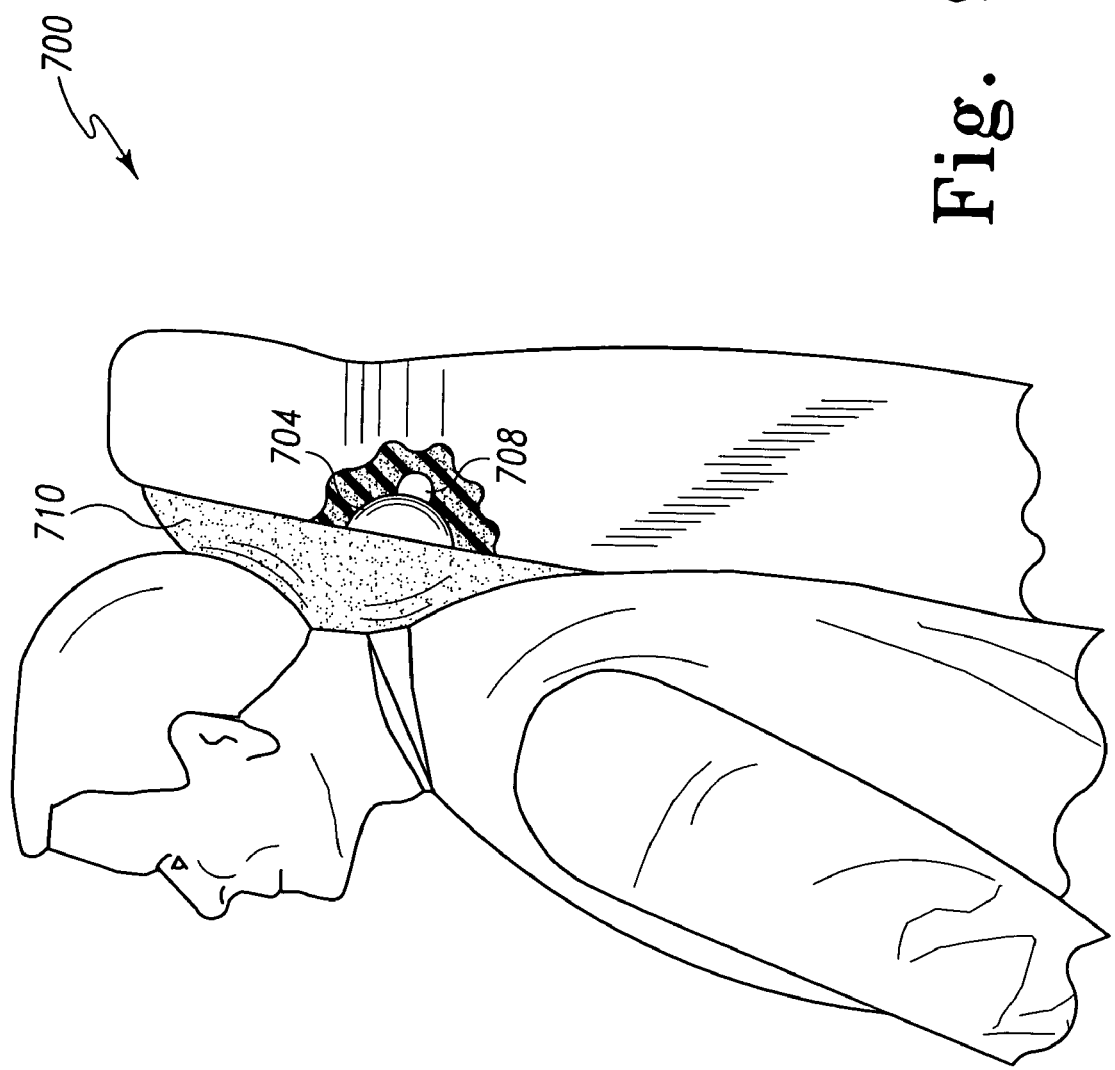
FIG. 9 is a cutaway side view of the fourth example seatback audio system of FIG. 7 showing a seat occupant.

A fourth illustrative seatback audio system 700 is shown in FIGS. 7, 8 and 9. The seatback audio system 700 may include a speaker 706 mounted in a concave area 702 of a seatback 712. A second speaker 708 may be mounted in a second concave area 704 of the seatback 712. The seatback audio system 700 may also include a sound barrier 710. The geometry of the seatback 712 may be chosen to provide sound isolation to others by using a portion of the seatback 712 as a physical barrier to reduce and or control the dispersion pattern of the speakers 706 and 708.

As shown in FIG. 7, the speakers 706 and 708 may be mounted so that their faces lie flush with the surface of the concave areas 702 and 704. The sound barrier 710 may be mounted to conform to the surface of the seatback 712, and to protrude outwardly therefrom at least one-eighth of the lateral dimension of one of the speakers 706 and 708. The speakers 706 and 708 may be similar to the speakers 108 and 110. The sound barrier 710 may be formed from a resilient acoustically reflective or an acoustically absorbent material as discussed previously. For example, the sound barrier 710 may be formed from some type of foam, which may be upholstered.

As shown in FIG. 9, the sound barrier 710 may be positioned such that it is in contact with the occupant's back and/or shoulders, and also may be positioned so that it is aligned with the occupant's spine. The sound barrier 710 may reflect or absorb sound waves. Thus, the concave areas 702 and 704, the sound barrier 710, and the occupant's back and/or neck and/or shoulders may direct sound from the speakers 706 and 708 to the occupant's respective ears. The sound waves may also be reflected outward by the occupant's neck and/or head, further increasing right/left separation. A manual, semi-automatic, or automatic positioning system may be used to optimize the location of the speakers 508 and 510 relative to the occupant's ears.

Removable Seatback Audio System

Figure 11:
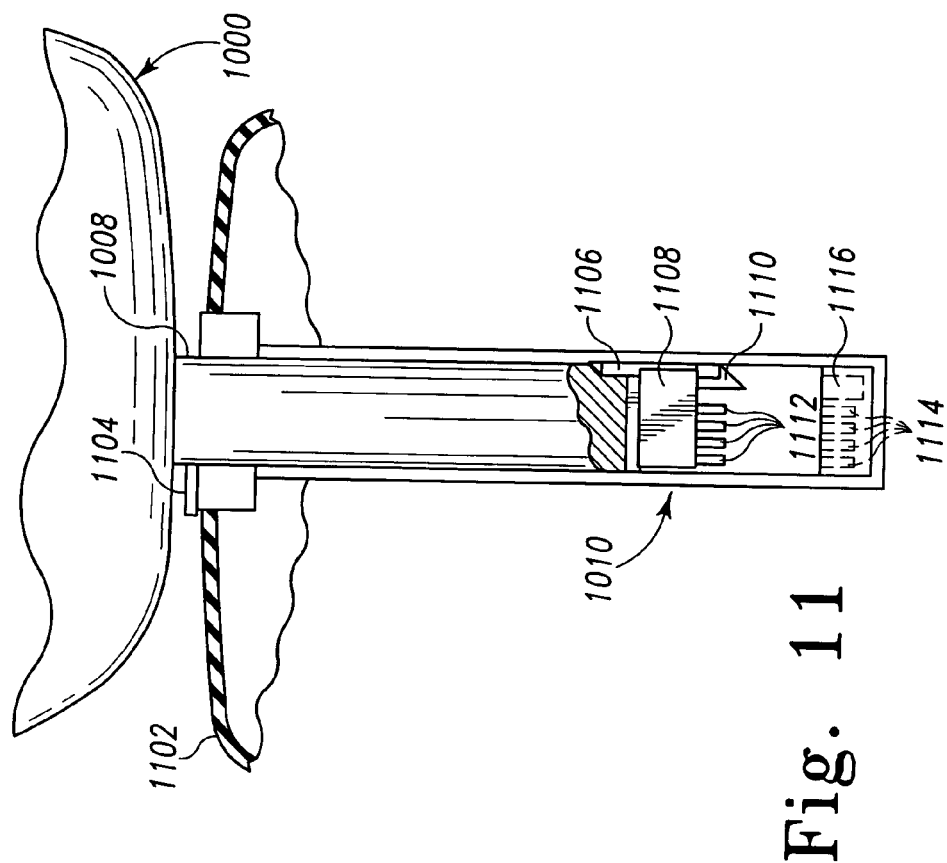
FIG. 11 is a cutaway side view of a connector of the example seatback audio system of FIG. 10.
Figure 10:
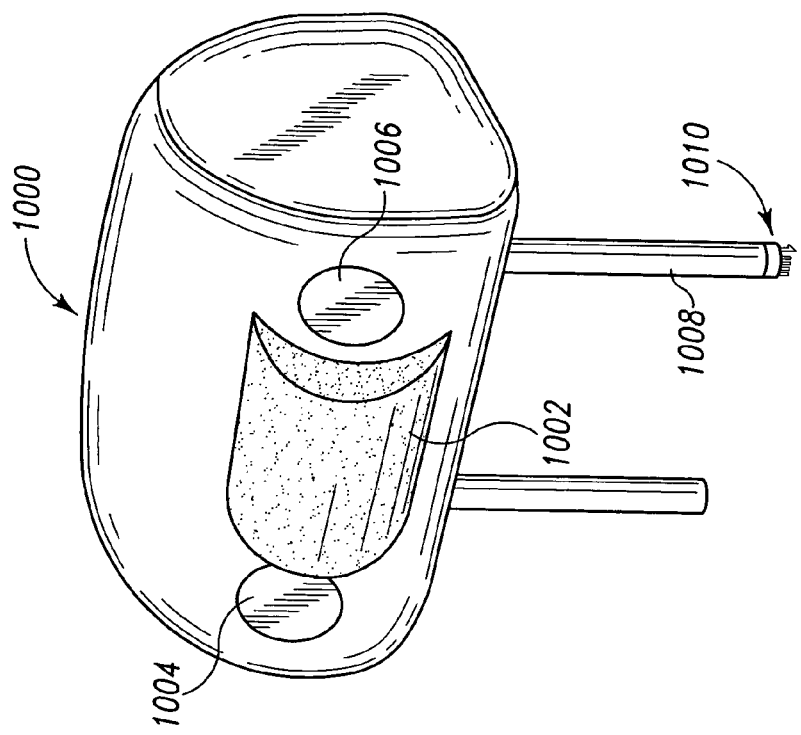
FIG. 10 is a perspective view of an example of a seatback audio system with a snap-on connector arrangement.

A removable seatback audio system 1000 having a snap-on connector 1010 is shown in FIGS. 10 and 11. The removable seatback audio system 1000 may include speakers 1004 and 1006, and sound barrier 1002, similar to the seatback audio systems described above. The seatback audio system 1000 also includes a mounting post 1008 having an electrical connector 1010.

As shown in FIG. 11, the seatback 1102 may have a mounting port 1104 for receiving the mounting post 1008. A locking tab 1110 may removably couple to a socket 1116 to secure the removable seatback audio system 1000 to the seatback 1102. Wires (not shown) may be located in a channel 1106 which extends though the mounting post 1008 to the body of the removable seatback audio system 1000. The channel 1106 may be annular or rectangular or any shape that will house the wires.

The electrical connector 1010 may be adapted to mate with an electrical connector 1016 located in a seatback 1102. The electrical connector 1010 may include a connector housing 1108 having multiple terminals 1112. Likewise, the electrical connector 1016 may include multiple terminals 1116. As shown in FIG. 11, the housing 1108 and the electrical connector 1016 include four terminals 1112 and 1116, respectively. The terminals 1116 may be coupled to an audio amplifier (not shown) that generates positive and negative polarity speaker signals.

The terminals 1112 and 1116 may be coupled to conduct the positive and negative polarity signals for each of the speakers 1004 and 1006. When the mounting post 1008 is received by the mounting port 1104, the terminals 1112 and 1116 may form circuits between the amplifier and the speakers 1004 and 1006, thereby providing speaker signals to the speakers 1004 and 1006.

Seatback Audio Soft-Cell Waveguides

Figure 13:
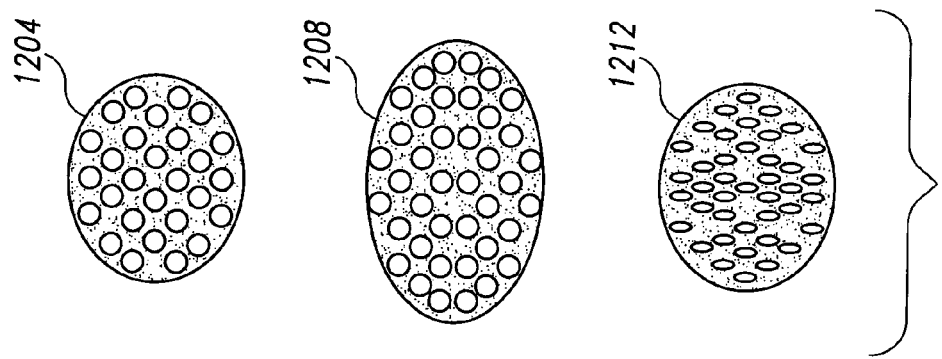
FIG. 13 is a front view of the example of various seatback audio soft-cell waveguides of FIG. 12.
Figure 12:
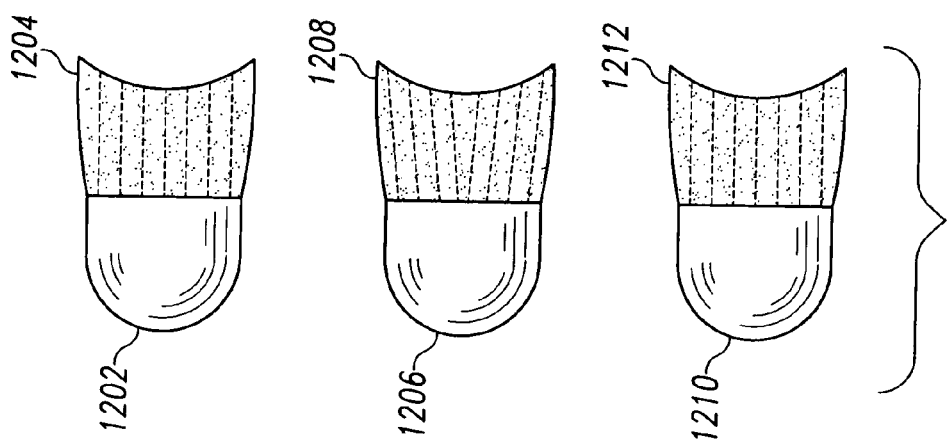
FIG. 12 is a side view of examples of various seatback audio soft-cell waveguides.

Seatback audio soft-cell waveguides 1204, 1208, and 1212 are shown in FIGS. 12, 13, 14, and 15. Speakers 1202, 1206, and 1210 may be miniature high-fidelity transducers, such as 12 to 50 mm drivers of the type found in laptop computers, or some other type of transducer suited for mounting in seatback. Soft-cell waveguides 1204, 1208, and 1212 may be formed from an open-cell or closed cell type foam, such as reticulated polyester foam and may comprise several soft cylindrical tubes formed in a honeycomb arrangement, as shown in FIG. 13. The height of the soft-cell waveguides 1204, 1208, and 1212 may be at least one-eighth of a lateral dimension of the respective speakers 1202, 1206, and 1210.

The honeycomb hollow tube arrangements may be used to control the directivity pattern of sound fields generated by the speakers 1202, 1206, and 1210. For example, the wave guide 1204 may be adapted for directing sound away from the speaker 1202 in a straight dispersion pattern. This directivity may improve the spatial attributes of sound filed generated by the speakers 1202, and may also better isolate the occupant's sound field. For example, the wave guide 1208 may be adapted for directing sound away from the speaker 1202 in an elliptical dispersion pattern having a lateral major axis. The wave guide 1212 may be adapted for directing sound away from the speaker 1202 in a dispersion pattern having an elliptical dispersion pattern having a vertical major axis.

Figure 14:
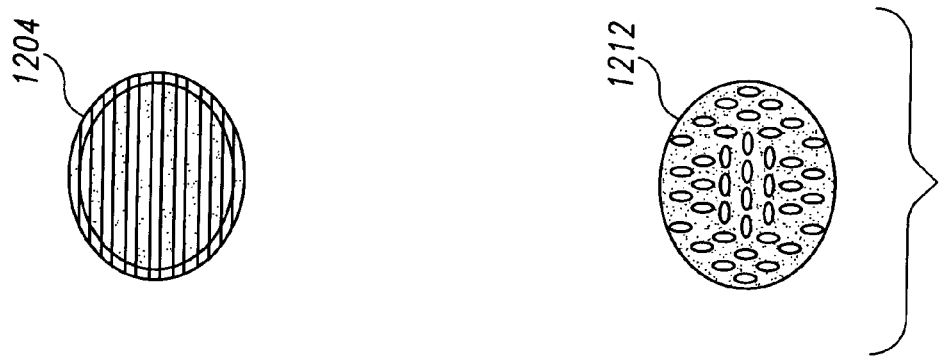
FIG. 14 is a front view of alternative example configurations of the various seatback audio soft-cell waveguides of FIG. 12.

FIG. 14. shows alternative configurations for the soft-cell waveguides 1204 and 1212. The soft-cell waveguide 1204 has tubes that are shaped like slots. The tubes of waveguide 1204 may produce a sound field that has a wide horizontal dimension and a narrow vertical dimension. The soft-cell waveguide 1212 has an arrangement of elliptically-cross sectioned tubes. The tubes nearest the center of the soft-cell waveguide 1212 have a major axis in the horizontal direction, while the tubes nearest the edge have a major axis in the vertical direction. The configuration of the tubes in the soft-cell waveguide 1212 may produce a sound field that has a wide horizontal and vertical dispersion.

Figure 15:
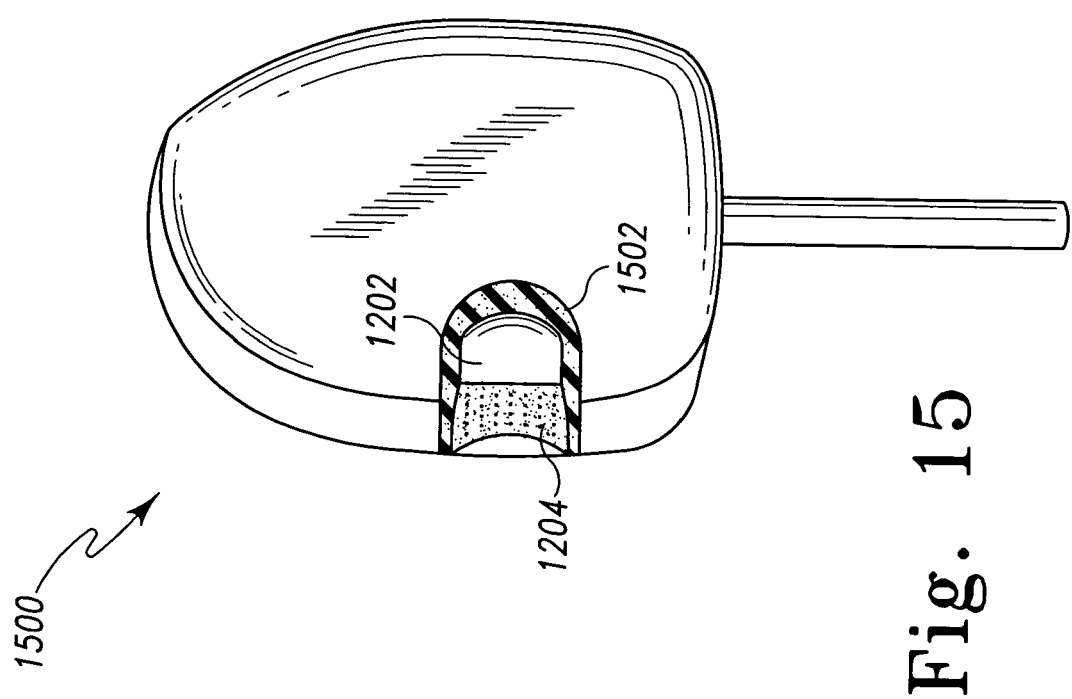
FIG. 15 is a cutaway side view of an example of a seatback audio system including a seatback audio soft-cell waveguide of FIG. 12.

An example seatback audio system 1500 is shown in FIG. 15. The seatback audio system 1500 may include the speaker 1202 mounted in a headrest. The speaker 1202 is covered by the soft-cell waveguide 1204. As explained above, this arrangement of the speaker 1202 and the soft-cell waveguide 1204 helps control the directivity pattern of the generated sound field to reduce undesired effects, such as cross-talk. Such an arrangement of the speaker 1202 and the soft-cell waveguide 1204 may be used with any of the seatback audio systems 100, 300, 500, 700, and 1000.

For example, in the seatback audio systems 300, the wave guide 1212 may be used to direct sound from speaker 308 in dispersion pattern having in an elliptical pattern having a vertical major axis. Such a dispersion pattern may decrease sound waves heading toward the barrier 306 and the speaker 310. Such a dispersion pattern also may decrease sound waves heading away from the headrest 300 in a lateral direction, where another person may be seated.

Manual Seatback Speaker Positioning System

Figure 16:
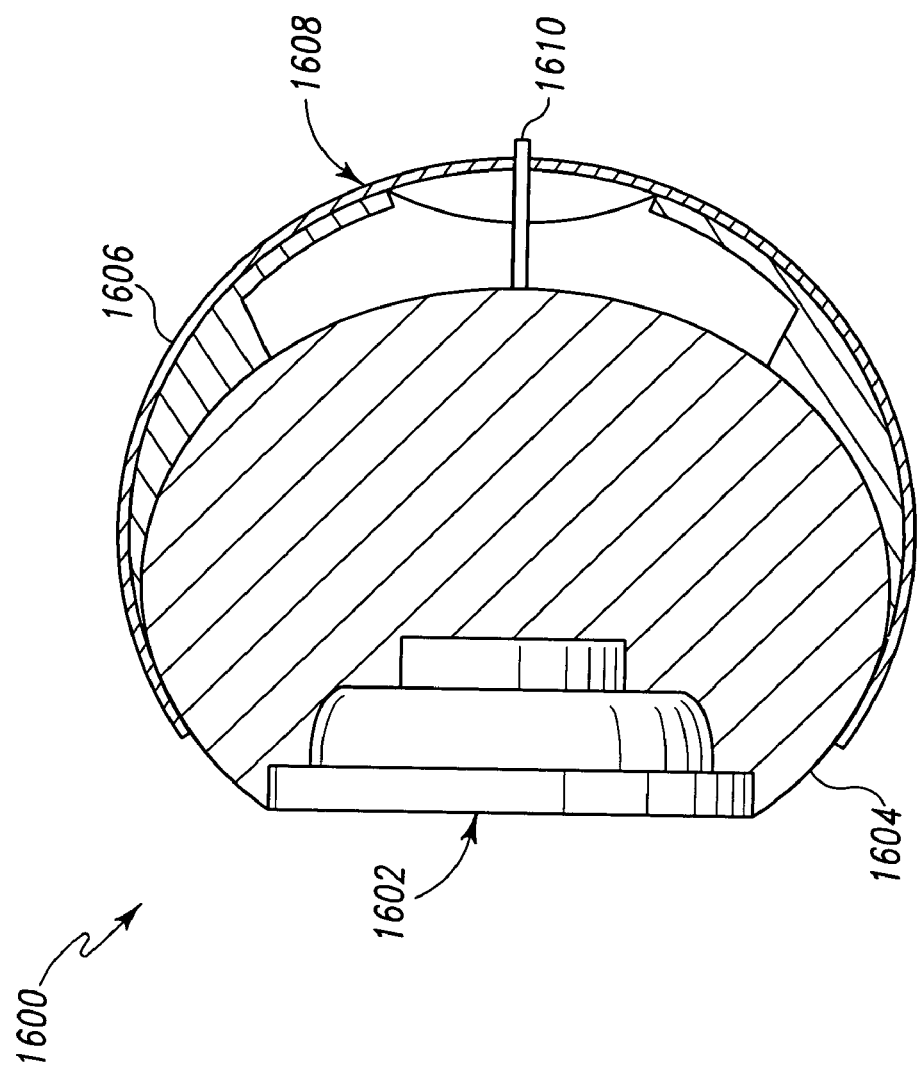
FIG. 16 is a cutaway side view of an example of a manual seatback speaker positioning system.

A seatback audio system may be used by different seat occupants at different times. Different occupants may have differing physical characteristics, such as height, distance between ears, and head, neck and shoulder geometry. Also, from day to day, a single occupant may wear different apparel having different acoustical characteristics, such as acoustic reflection and absorption. A manual seatback speaker positioning system 1600 for use with a seatback audio system is shown in FIG. 16. The manual seatback speaker positioning system 1600 may allow for improved acoustics by compensating for some these individual physical and acoustical characteristics of an occupant.

The manual speaker positioning system 1600 may be used with any of the seatback audio systems 100, 300, 500, 700, and 1000 by mounting the socket 1606 in the respective seatback. The speaker positioning system 1600 includes a speaker 1602, a ball 1604, and a socket 1606. The socket 1606 has an aperture 1608 positioned opposite the speaker 1602. A stop post 1610 is coupled to the ball 1604 and may protrude through the aperture 1608.

The speaker positioning system 1600 provides the capability to pivot speakers in the X, Y, and Z planes. Repositioning the speaker 1602 may allow for improved sound field acoustics for the occupant. For example, the occupant may exert manual force on a speaker grill (not shown) to reposition the speaker 1602 such that the sound waves exit the speaker 1602 at an angle allowing for improved acoustics for the occupant. Such speaker placement, however, may depend on characteristics of the occupant such as size, height, hearing ability, etc. 27. As an alternative, speaker positioning system 1600 may be reconfigured so that the speaker 1602 is mounted to the socket 1606, and the ball 1604 is coupled to the seatback.

First Automated Seatback Speaker Positioning System

Figure 17:
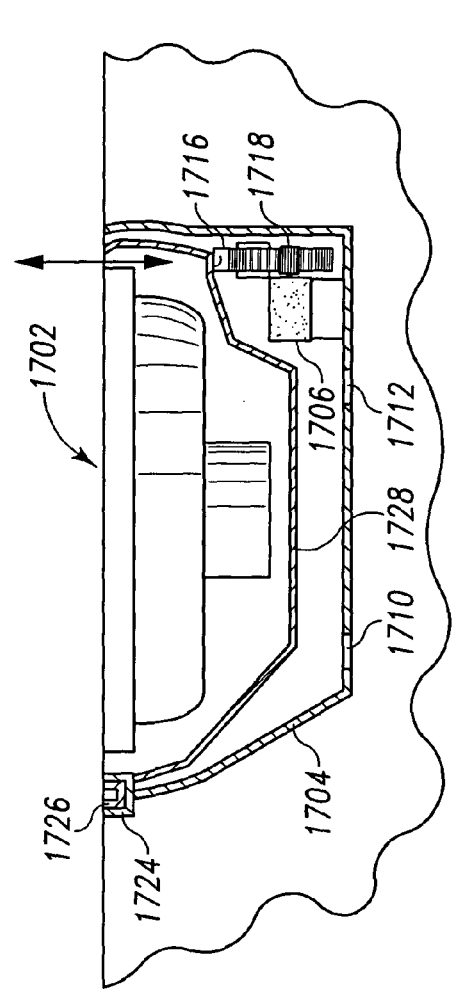
FIG. 17 is a bottom view of an example of an automated seatback speaker positioning system.
Figure 18:
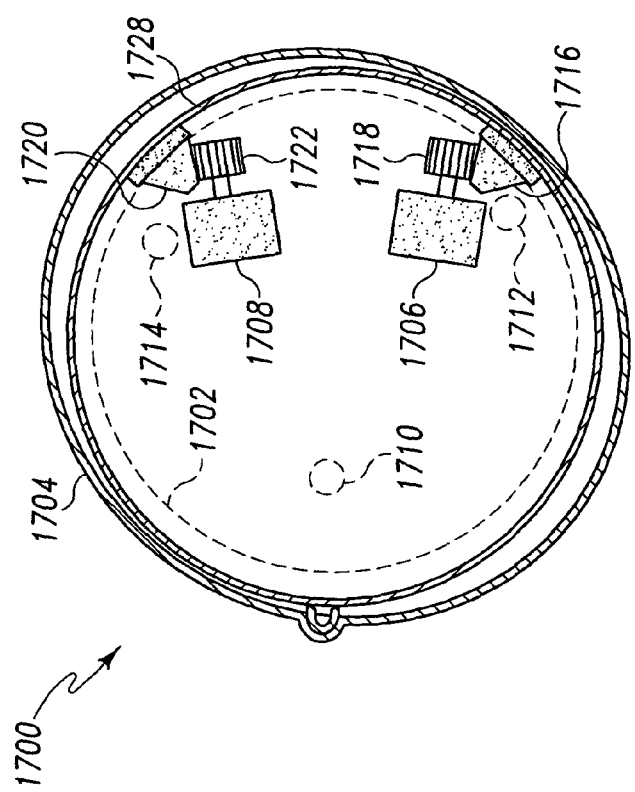
FIG. 18 is a cutaway side view of the example automated speaker positioning system of FIG. 17.

FIG. 17 is a bottom view of an automated seatback speaker positioning system 1700 for use with a seatback audio system. FIG. 18 is a side view of the automated speaker positioning system 1700. Like the manual seatback speaker positioning system 1600, the automated speaker positioning system 1700 may be used with any of the seatback audio systems 100, 300, 500, 700, and 1000 by mounting the socket 1606 in the respective seatback. The automated seatback speaker positioning system 1700 may allow for improved acoustics by compensating for some the individual physical and acoustical characteristics of an occupant discussed above. The automated speaker positioning system 1700 includes a speaker 1702, a movable speaker mount 1728, a housing 1704, motors 1706 and 1708, and gear straps 1716 and 1720.

The motors 1706 and 1708 may be bi-directional DC or AC motors having a high torque output. The motors may include gears 1718 and 1722 that interact with the gear straps 1716 and 1720. The gears 1718 and 1722 and the gear straps 1716 and 1720 may be formed from flexible nylon. The housing 1704 may include mounting holes 1710, 1712, and 1714. The mounting holes 1710, 1712, and 1714 may be used to mount the housing 1704 to a seatback, either internally or externally.

The speaker mount 1728 may be movably coupled to the housing 1704 at a joint created by a tab 1726 and a slot 1724. As shown in FIG. 18, the tab 1726 may be formed in the housing 1704, and the slot 1724 may be formed in the movable speaker mount 1724. The joint formed by the tab 1726 and the slot 1724 may allow the movable speaker mount 1728 to tilt up and down and side to side.

In operation, the motors 1706 and 1708 may be operated independently to tilt the movable speaker mount 1728 from side to side. Additionally, the motors 1706 and 1708 may be operated together to tilt the movable speaker mount 1728 up or down. For example, the motors 1706 and 1708 may be controlled manually or semi-automatically by a joystick control. Alternatively, the motors 1706 and 1708 may be controlled by a computerized controller. For example, the seatback may contain sensors to determine the position of the occupant's head, and aim the speaker 1702 towards one of the occupant's ears. Such repositioning of the speaker 1702 may allow for improved sound field acoustics for a listener by compensating for some the individual physical and acoustical characteristics of the listener.

Second Automated Seatback Speaker Positioning System

Figure 20:
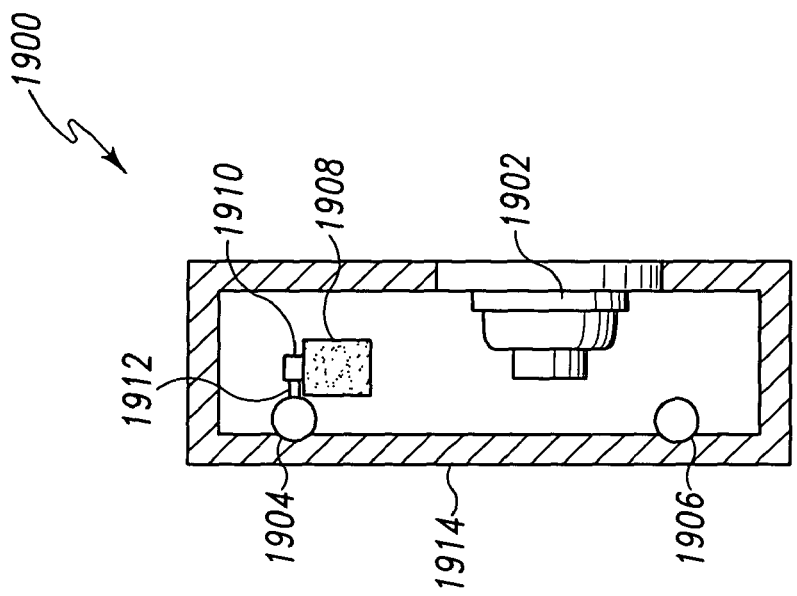
FIG. 20 is a cutaway side view of the example seatback audio system of FIG. 19.
Figure 19:
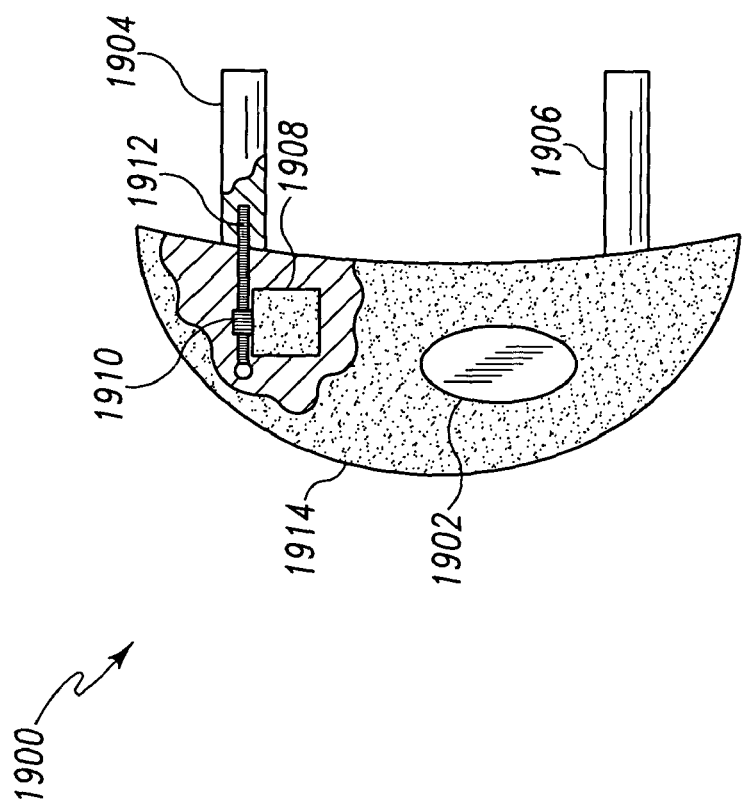
FIG. 19 is a front view of an example of a seatback audio system having an automated positioning feature.
Figure 21:
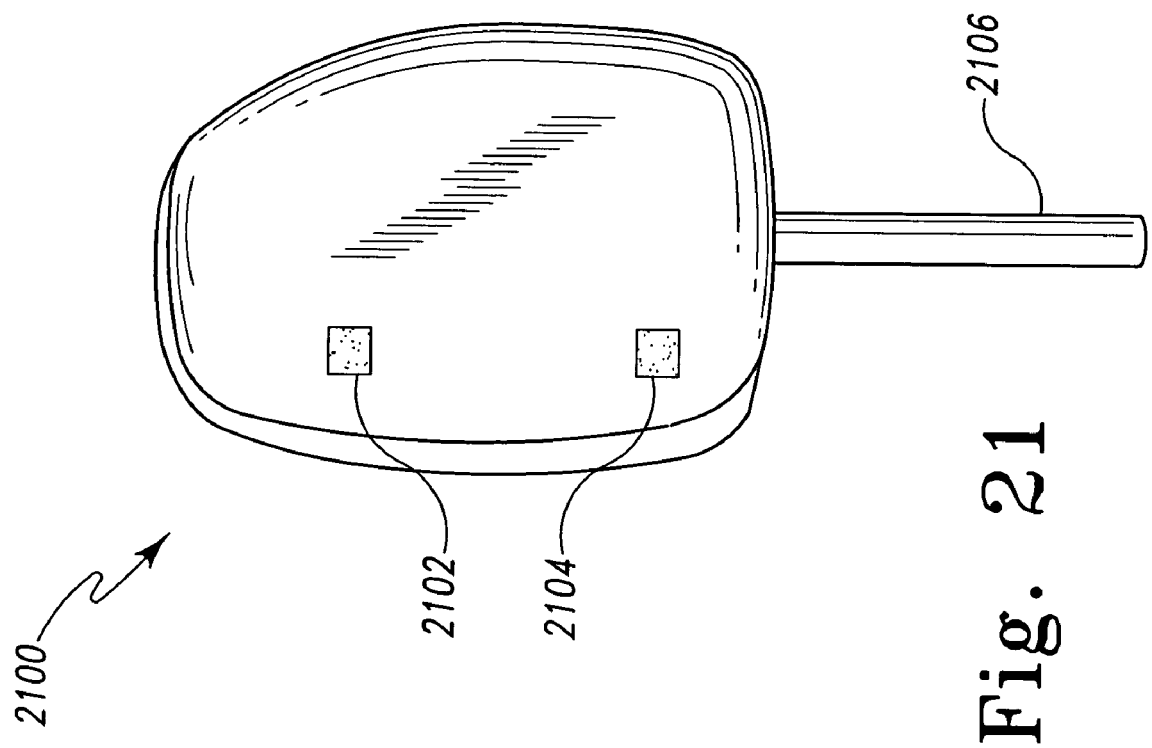
FIG. 21 is a side view of an example headrest adapted for use with the seatback audio system of FIG. 19.

FIG. 19 is a front view of an automated seatback speaker positioning system 1900 having an automated positioning feature. FIG. 20 is a side view of the seatback audio system 1900. FIG. 21 is a side view of a headrest 2100 adapted for use with the automated seatback speaker positioning system 1900. FIG. 22 is a perspective view of the headrest 2100 having two of automated seatback speaker positioning systems 1900 mounted thereto. The automated seatback speaker positioning system 1900 may allow for improved acoustics by compensating for some the individual physical and acoustical characteristics of an occupant discussed above.

The automated seatback speaker positioning system 1900 includes a speaker 1902, mounting posts 1904 and 1906, a motor 1908, and a gear strap 1912. The motor 1908 may be a bi-direction DC or AC motor having a high torque output. The motor 1908 may include a gear 1910 that interacts with the gear strap 1912. The gear 1910 and the gear strap 1912 each may be formed from flexible nylon or other appropriate material such as a plastic or a metal.

The body 1914 of the automated seatback speaker positioning system 1900 may be rigidly coupled to the motor 1910 and slidably coupled to the mounting posts 1904 and 1906. Therefore, when the motor 1908 is activated, the body 1914 may slide back and forth on the mounting posts 1904 and 1906.

As shown in FIG. 20, the headrest 2100 includes mounting holes 2102 and 2104 that may receive the mounting posts 1904 and 1906. The mounting holes 2102 and 2104 each may have a longitudinal axis that is not perpendicular to the mounting surface, so that when the body 1914 of the automated seatback speaker positioning system 1900 slides, it slides either forward and out, or backward and in. Moving the speaker 1902 in such a manner relative to the headrest 2100 may allow for improved sound field acoustics by compensating for some the individual physical and acoustical characteristics of a listener.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An seatback audio system for use with a seat, comprising:
  a seatback having a surface;
  a first speaker having a first lateral dimension coupled to the surface of the seatback;
  a second speaker having a second lateral dimension coupled to the surface of the setback; and
  a sound barrier coupled to the surface of the seatback and positioned between the first speaker and the second speaker to form a partition that provides stereo separation of sound waves to be emanated from the lint and second speakers;
  where the sound barrier has an outermost arcuated surface extending from the surface of the seatback by a distance.

2. The seatback audio system of claim 1 where the first lateral dimension is equal to the second lateral dimension.

3. The setback audio system of claim 1 where the distance is greater than one-eighth of the first lateral dimension.

4. The seatback audio system of claim 1 where the distance is greater than one-quarter of the first lateral dimension.

5. The setback audio system of claim 1 where the distance is greater than one-half of the first lateral dimension.

6. The seatback audio system of claim 1 where the surface of the setback includes a first concave surface and a second concave surface, and the first speaker is coupled to the first concave surface and the second speaker is coupled to the second concave surface.

7. The seatback audio system of claim 1 where the first speaker and the second speaker are arranged as a dipole.

8. The seatback audio system of claim 1 where the seatback includes a headrest, and the surface of the seatback is the surface of the headrest.

9. The seatback audio system of claim 1 where the first speaker produces a right audio channel of an audio program, and the second speaker produces a left audio channel of an audio program.

10. The seatback audio system of claim 1 where the first speaker is coupled to an automated positioning system, and automated positioning system is coupled to the surface of the seatback.

11. The seatback audio system of claim 10 where automated positioning system includes:
  a housing;
  a movable speaker mount;
  a motor having a first gear coupled to the housing; and
  a second gear coupled to the movable speaker mount;
  where the first speaker is coupled to the movable speaker mount, and the first and second gears interact to move the movable speaker mount.

12. The seatback audio system of claim 10 where automated positioning system includes:
  a housing;
  a movable speaker mount;
  a motor having a first gear coupled to the movable speaker mount; and
  a second gear coupled to the housing;
  where the first speaker is coupled to the movable speaker mount, and the first and second gears interact to move the movable speaker mount.

13. The seatback audio system of claim 1 comprising a soft-cell waveguide, the soft-cell waveguide having:
  an innermost surface coupled to the first speaker;
  an outermost surface spaced from the innermost surface; and
  a plurality of hollow tubes extending from the innermost surface to the outermost surface.

14. A seatback audio system for use with a seat, comprising:
  a seatback;
  a first speaker having a first lateral dimension coupled to the seatback;
  a second speaker having a second lateral dimension coupled to the seatback; and a soft-cell waveguide, the soft-cell waveguide having:
  an innermost surface coupled to the first speaker;
  an outermost surface spaced from the innermost surface; and
  a plurality of hollow tubes extending from the innermost surface to the outermost surface.

15. The seatback audio system of claim 14 where the plurality of hollow tubes includes at least ten tubes.

16. The seatback audio system of claim 14 where the plurality of hollow tubes includes at least twenty tubes.

17. The seatback audio system of claim 14 where the plurality of hollow tubes are honeycomb in shape.

18. The seatback audio system of claim 14 where the plurality of hollow tubes are round in shape.

19. The seatback audio system of claim 14 where the plurality of hollow tubes are cylindrical in shape.

20. The seatback audio system of claim 14 where the soft-cell waveguide is formed from a flexible, resilient material.

21. The seatback audio system of claim 20 where the soft-cell waveguide is formed from open-cell foam.

22. The seatback audio system of claim 20 where the soft-cell waveguide is formed from closed-cell foam.

23. The seatback audio system of claim 14 where the surface of the seatback includes a recessed surface, the first speaker is coupled to the recessed surface.

24. An seatback audio system, comprising:
a headrest including a front surface and a mounting post having a first electrical connector;
a speaker coupled to the front surface of the headrest and electrically coupled to the first electrical connector; and
a backrest including a mounting port adapted to receive the mounting post, the mounting port having a second electrical connector;
where the first electrical connector and the second electrical connector are adapted to form an electrical connection when the mounting port receives the mounting post.

25. The seatback audio system of claim 24, where the headrest has front surface, further including a second speaker coupled to the front surface of the headrest and electrically coupled to the first connector, and a sound barrier coupled to the front surface of the headrest and positioned between the first speaker and the second speaker.

26. An seatback audio system for use with a seat, comprising:
a first speaker having a first lateral dimension configured to be coupled to a seatback;
a second speaker having a second lateral dimension configured to be coupled to the seatback and separated from the first speaker;
a sound barrier configured to be coupled to the seatback and configured to be positioned between the first speaker and the second speaker;
where the sound barrier baa an outermost surface configured to be spaced apart from a surface of the seatback; and
a soft-cell waveguide, the soft-cell waveguide comprising:
an innermost surface coupled to the first speaker;
an outermost surface spaced from the innermost surface; and
a plurality of hollow tubes extending from the innermost surface to the outermost surface.

27. The seatback audio system of claim 26 where the first lateral dimension is equal to the second lateral dimension.

28. The seatback audio system of claim 26 where the surface of the seatback includes a first concave surface and a second concave surface, and the first speaker is coupled to the first concave surface and the second speaker is coupled to the second concave surface.

29. The seatback audio system of claim 26 where the first speaker and the second speaker are ranged as a dipole.

30. The seatback audio system of claim 26 where the seatback includes a headrest, and the surface is on the headrest.

31. The seatback audio system of claim 26 where the first speaker produces a right audio channel of an audio program, and the second speaker produces a left audio channel of an audio program.

32. The seatback audio system of claim 26 where a periphery of the outermost surface is elliptical.

33. The seatback audio system of claim 26 where the outermost surface is concaved and forms an elliptical periphery.

34. The seatback audio system of claim 26 where the first speaker is coupled to an automated positioning system, and the automated positioning system is coupled to the surface of the seatback.

35. The seatback audio system of claim 34 where the automated positioning system includes:
a housing;
a movable speaker mount;
a motor having a first gear coupled to the housing; and
a second gear coupled to the movable speaker mount;
where the first speaker is coupled to the movable speaker mount, and the first and second gears interact to move the movable speaker mount.

36. The seatback audio system of claim 35 where automated positioning system includes:
a housing;
a movable speaker mount;
a motor having a first gear coupled to the movable speaker mount; and
a second gear coupled to the housing;
where the first speaker is coupled to the movable speaker mount, and the first and second gears interact to move the movable speaker mount.

37. The seatback audio system of claim 35, where the seatback includes a backrest and a headrest, and the surface is on the headrest,
the headrest comprising a mounting post having a first electrical connector that is coupled with at least one of the first and second speakers,
where the backrest includes a mounting port configured to receive the mounting post and a second electrical connector that is positioned in the backrest to couple with the first electrical connector when the mounting port receives the mounting post.

38. An seatback audio system, comprising:
a headrest including a surface and a mounting post having a first electrical connector;
a speaker coupled to the surface of the headrest and electrically coupled to the first electrical connector; and
a backrest including a mounting port adapted to receive the mounting post, the mounting port having a second electrical connector;
where the first electrical connector and the second electrical connector are adapted to form an electrical connection when the mounting port receives the mounting post, the electrical connection to provide electrical power to the seatback audio system.

39. The seatback audio system of claim 38, where the surface further includes a second speaker mounted in the surface and electrically coupled to the first connector, and a sound barrier coupled mounted in the surface and positioned between the first speaker and the second speaker.

40. The seatback audio system of claim 8 where the headrest includes a mounting post having a first electrical connector that is coupled with a least one of the first and second speakers, and the seatback further includes a backrest, where the backrest includes a mounting port and a second electrical connector, the mounting port configured to receive the mounting post, and the second electrical connector is positioned in the backrest to couple with the first electrical connector when the mounting port receives the mounting post.

41. A seatback audio system for use with a seat, comprising:

a first speaker having a first lateral dimension, the first speaker coupled to a seatback;

a second speaker having a second lateral dimension, the second speaker coupled to the seatback separated away from the first speaker; and a sound barrier coupled to project outwardly from the seatback and interposed between the first speaker and the second speaker to maintain separation of sound waves to be emanated from the respective first and second speakers.

42. The seatback audio system of claim 41 where the sound barrier is configured to cooperatively operate with a body of an occupant of the seat to further maintain separation of sound waves to be emanated from the respective first and second speakers.

43. The seatback audio system of claim 41 where the first speaker and the second speaker are arranged as a dipole.

44. The seatback audio system of claim 41 where the sound barrier is positioned on the seatback to align with at least one of a head or a neck of an occupant of the seat.

45. The seatback audio system of claim 41 where the first speaker produces a right audio channel of an audio program, and the second speaker produces a left audio channel of an audio program.

46. The seatback audio system of claim 41 where the first speaker is coupled to an automated positioning system, and where the automated positioning system is coupled to the seatback.

47. The seatback audio system of claim 46 where the automated positioning system includes:

a housing;

a movable speaker mount;

a motor having a first gear coupled to the housing; and a second gear coupled to the movable speaker mount;

where the first speaker is coupled to the movable speaker mount, and the first and second gears interact to move the movable speaker mount.

48. The seatback audio system of claim 46 where the automated positioning system includes:

a housing;

a movable speaker mount;

a motor having a first gear coupled to the movable speaker mount; and a second gear coupled to the housing;

where the first speaker is coupled to the movable speaker mount, and the first and second gears interact to move the movable speaker mount.

49. The seatback audio system of claim 41 further comprising a soft-cell waveguide disposed in front of the first speaker, where the soft-cell waveguide comprises a plurality of hollow tubes extending substantially perpendicular to the first lateral dimension of the first speaker.

50. The seatback audio system of claim 41 further comprising a soft-cell waveguide having a first surface disposed contiguous with the first speaker, and a plurality of hollow tubes extending from the first surface to a second surface of the soft-cell waveguide that is spaced away from the first speaker.

51. The seatback audio system of claim 41, further comprising a first soft-cell waveguide having a plurality of hollow tubes projecting outwardly from the first speaker and a second soft-cell waveguide having a plurality of hollow tubes projecting outwardly from the second speaker.

52. The seatback audio system of claim 41, further comprising a plurality of hollow tubes formed from a soft-cell material and positioned to rest against the first speaker.

* * * * *